United States Patent [19]

Jakob

[11] Patent Number: 5,044,616

[45] Date of Patent: Sep. 3, 1991.

[54] LOCATING DEVICE FOR WORKPIECE-PROCESSING APPARATUS

[75] Inventor: Daniel Jakob, Elgin, Ill.

[73] Assignee: Jakob Tooling, Inc., East Dundee, Ill.

[21] Appl. No.: 597,423

[22] Filed: Oct. 15, 1990

Related U.S. Application Data

[63] Continuation-in-part of Ser. No. 440,020, Nov. 21, 1989, abandoned.

[51] Int. Cl.⁵ ............................................. B23Q 3/02
[52] U.S. Cl. .................................................. 269/309
[58] Field of Search .................... 269/309, 310, 74, 66, 269/56

[56] References Cited

U.S. PATENT DOCUMENTS

| | | | |
|---|---|---|---|
| 4,545,570 | 10/1985 | KaDell | 269/902 |
| 4,586,702 | 5/1986 | Chambers | 269/310 |
| 4,738,439 | 4/1988 | Satake | 269/309 |
| 4,834,358 | 5/1989 | Okolischan et al. | 269/309 |

Primary Examiner—Robert C. Watson

Attorney, Agent, or Firm—Wallenstein Wagner & Hattis, Ltd.

[57] ABSTRACT

A locating device for positioning a workpiece on a processing apparatus are disclosed. A first embodiment includes a base (22) and a fixture plate (24) with positioning means (30, 32) between the base and the fixture plate. An abutment (80) defines a fixed reference point for locking the fixture plate on the base through a clamping mechanism (100). The clamping mechanism also includes release cylinders (120) so that the fixture plate can be quickly interchanged for introducing a new workpiece. A second embodiment includes a base structure that comprises a first clamping unit (301a) and a second clamping unit (301b) that support a fixture plate (224) therebetween. First positioning means (330) secured to each clamping unit (301a, 301b) cooperate with second positioning means (232) secured to the fixture plate (224). Clamping means (530) engage and lock the fixture plate (224) in position. The clamping means (530) include locking members (531) that are slidably disposed in channels (303) in the blocks (302).

28 Claims, 6 Drawing Sheets

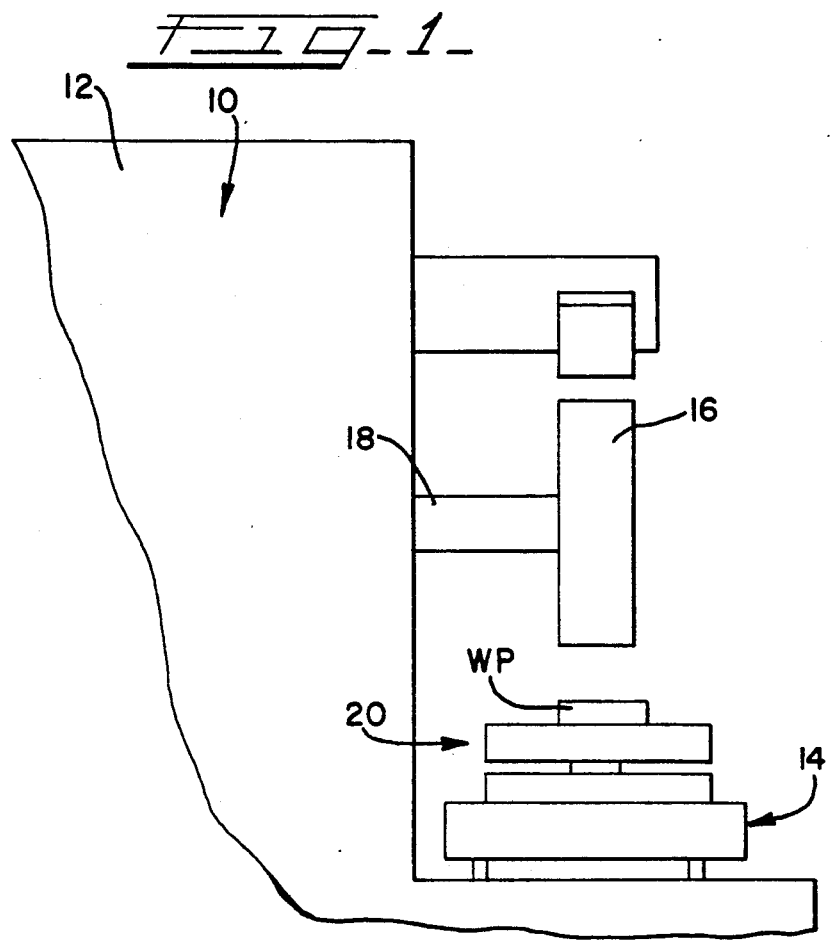
FIG-1-
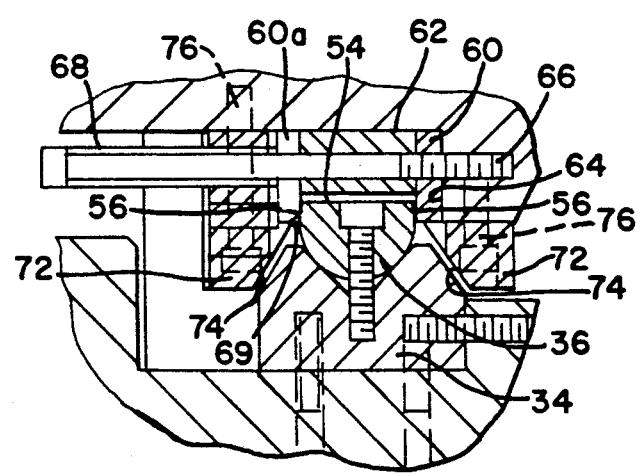
FIG-5A-

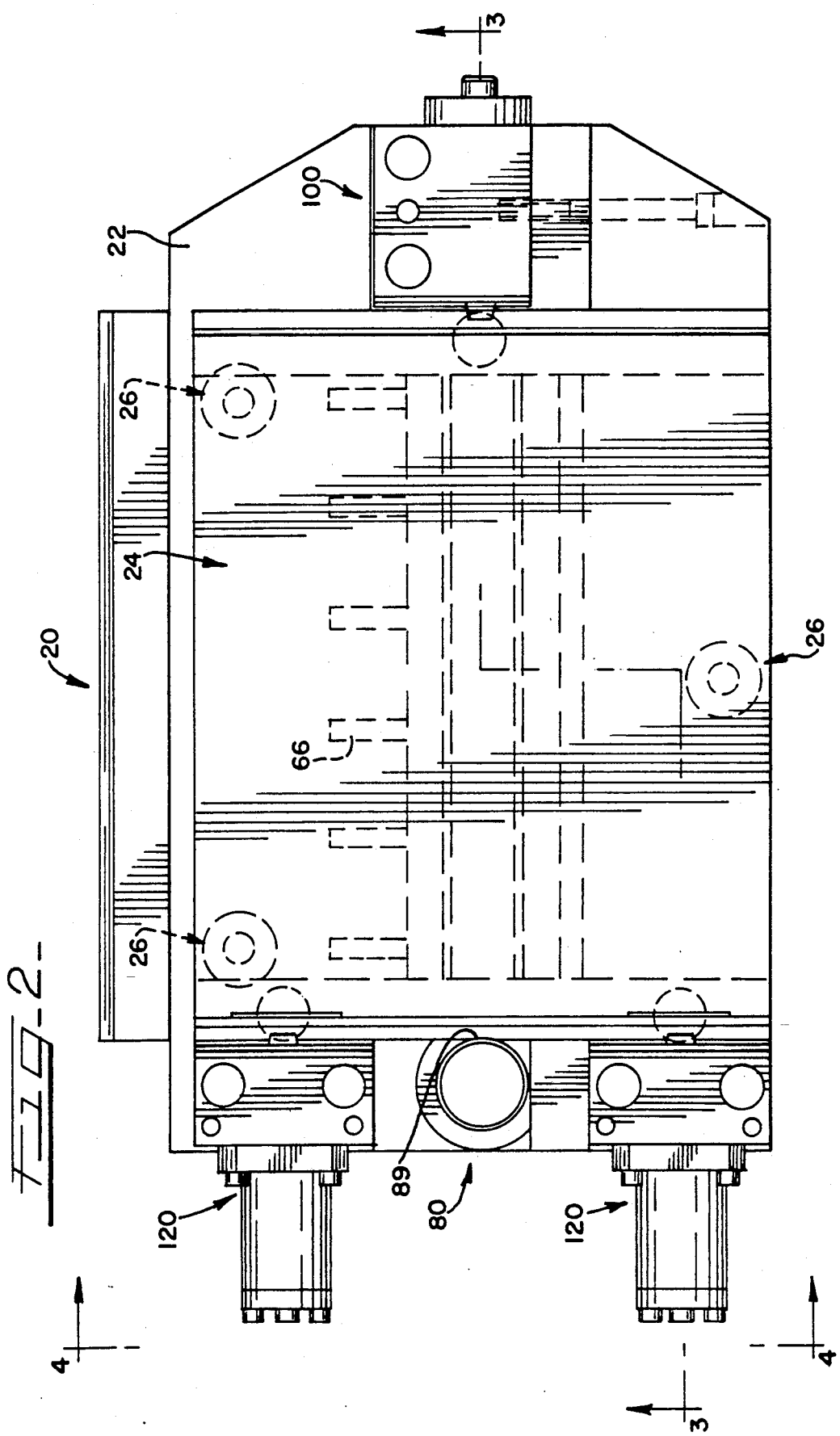

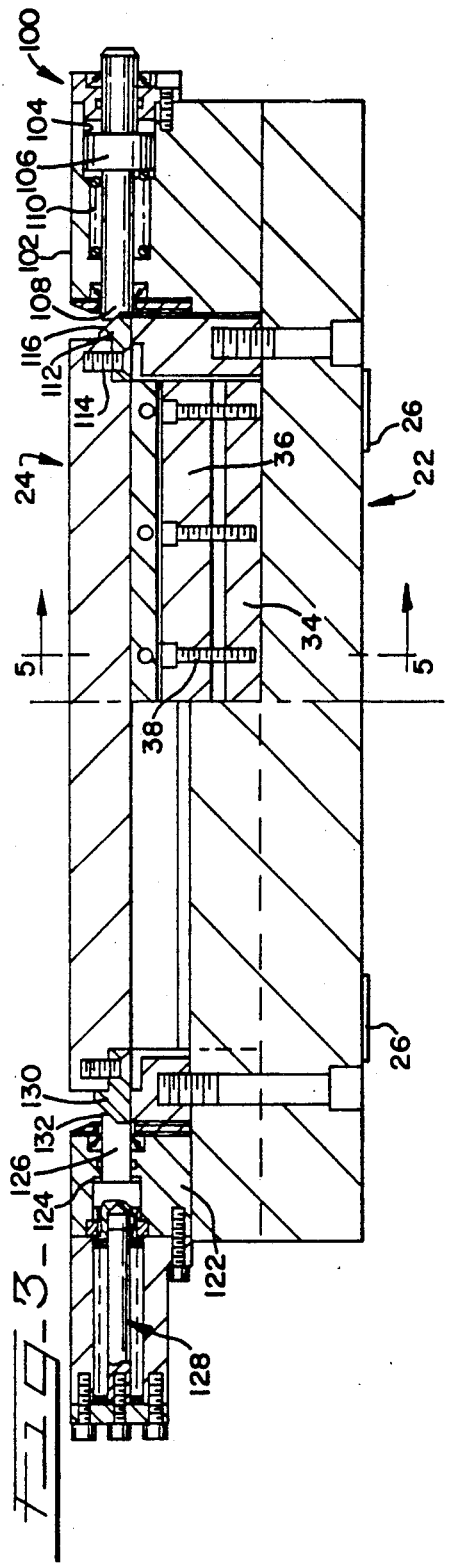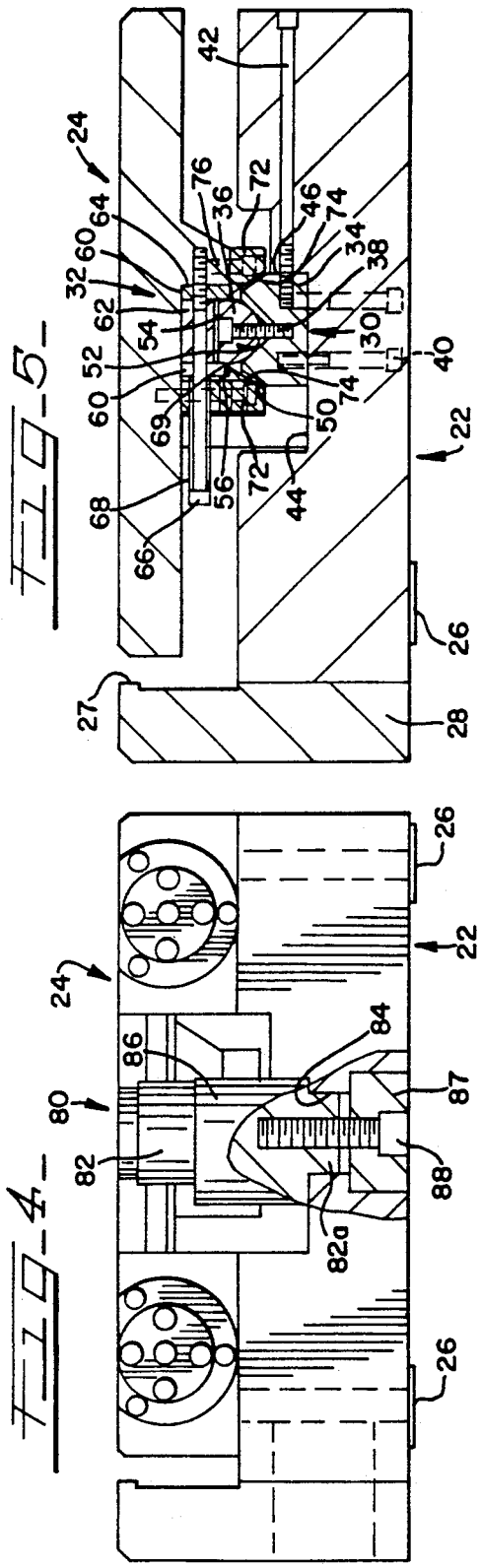

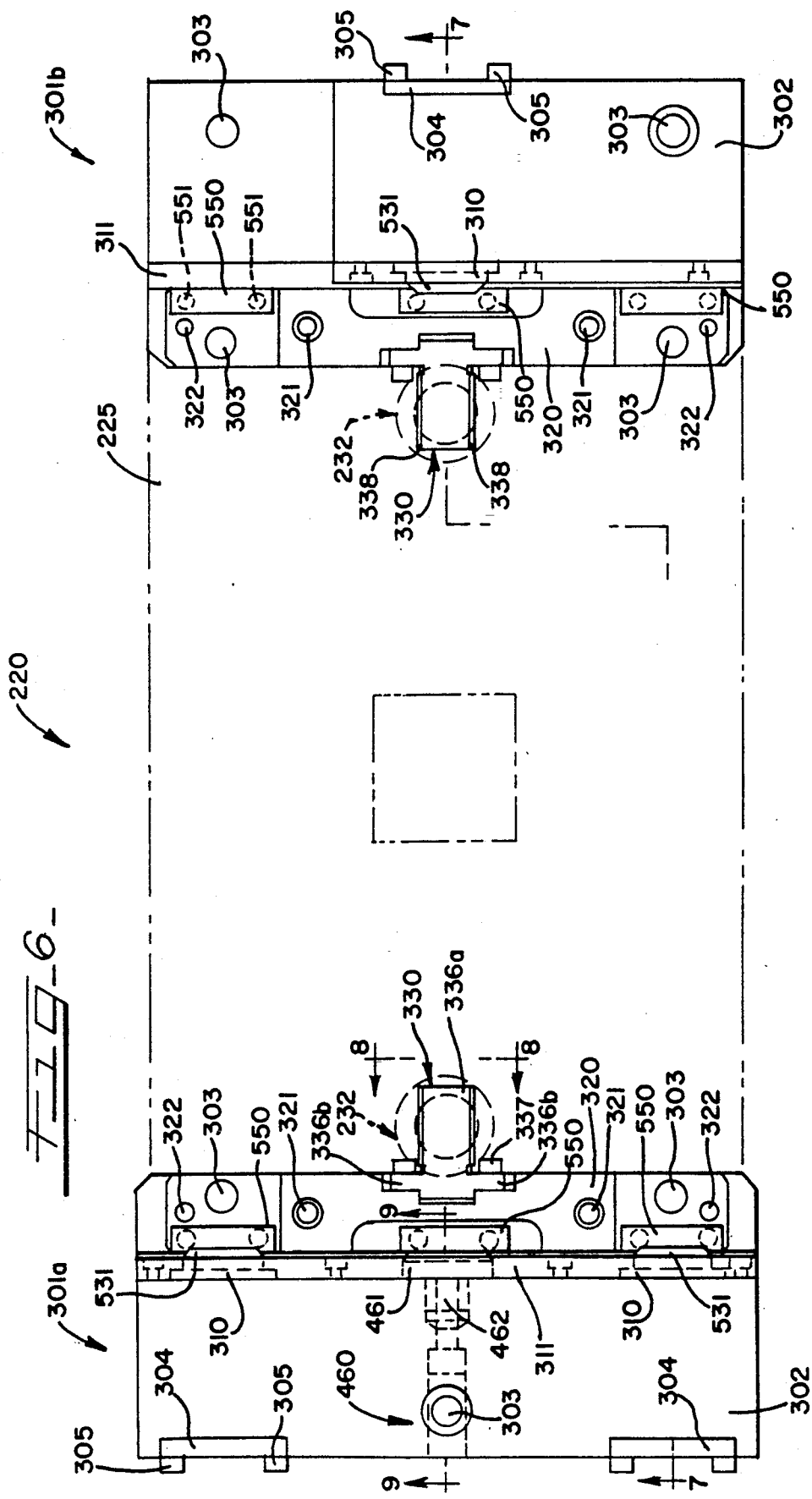

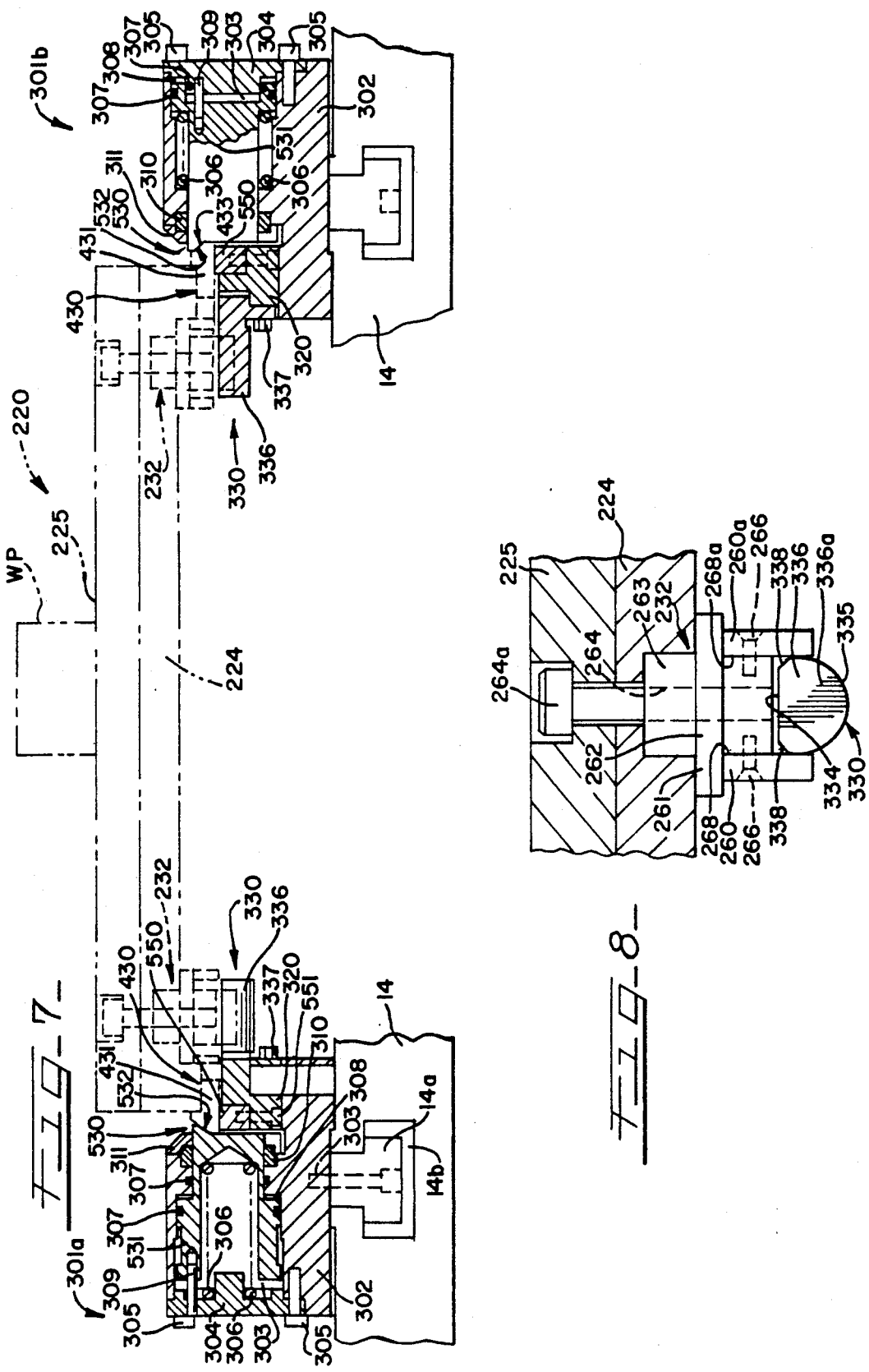

FIG_9
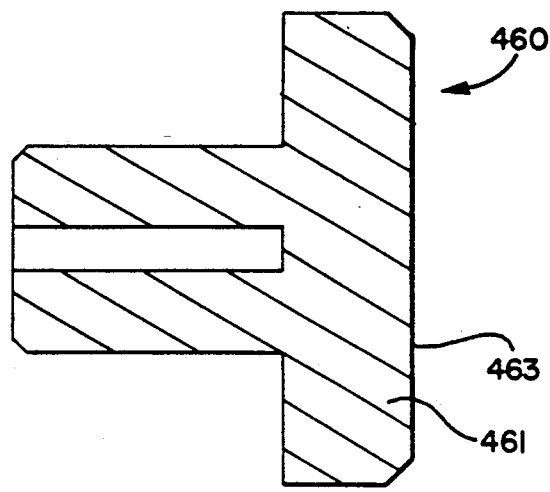
FIG_10
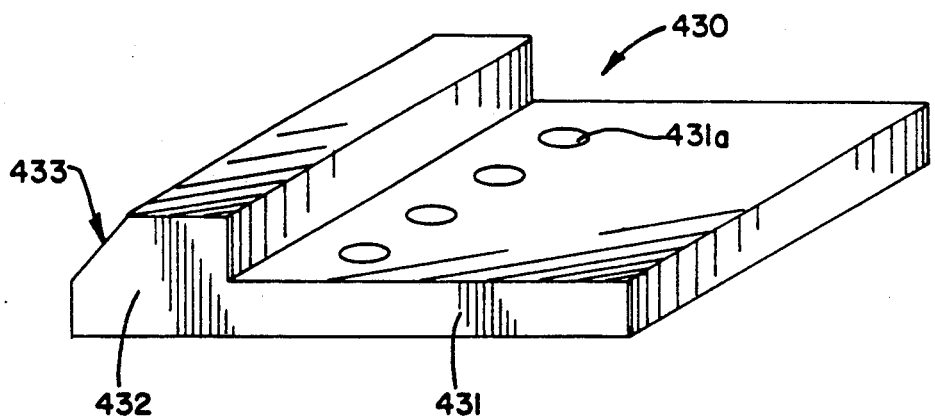
FIG_11
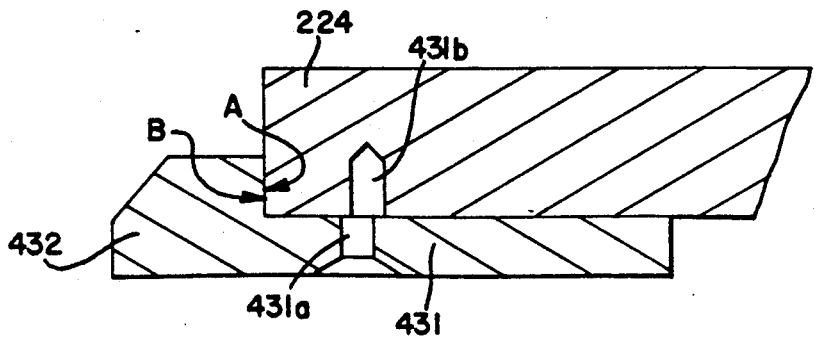

LOCATING DEVICE FOR WORKPIECE-PROCESSING APPARATUS

DESCRIPTION

Reference to Related Application

This application is a continuation-in-part application of Ser. No. 07/440,020, filed Nov. 21, 1989, now abandoned.

TECHNICAL FIELD

The present invention relates generally to processing apparatus for performing various functions on workpieces, and more particularly is concerned with a locating device for accurately positioning the workpiece with respect to the apparatus.

BACKGROUND PRIOR ART

In today's manufacturing environment, computerized numerical control (CNC) has become very prevalent as a tool for controlling the movement of the workpiece with respect to the tooling. There are many instances in which repeatability is a necessity for the efficient use of processing apparatus, such as creep feed grinding machinery, to make such operations economically feasible.

In creep feed grinding, it is customary to process various different parts, which are generally part of a family of parts, and in some instances, several families of parts are required to justify the high investment cost for the tooling. Thus, in order to justify the investment costs, the tooling must be capable of being set up in a short period of time, be readily interchangeable and readily be capable of being expanded to operate on any number of different parts. Repeatability and minimum down-time are necessary elements to support an operation of this type.

To meet this objective, it is desirable that the tooling system be modular and that there be a proper interaction of the tooling design with the part program design to make CNC programming more predictable. Moreover, to meet the requirement of speed and repeatability, an inexperienced operator must be able to provide the necessary set-up procedure economically and efficiently with minimum instruction. In addition, repeatability to within tolerances of less than 0.001 inch is mandatory for an effective operation of this type.

SUMMARY OF THE INVENTION

According to the present invention, a locating device has been developed for accurately positioning a workpiece within very close tolerances with respect to a processing apparatus, such as a creep feed grinder. The workpiece or part can be repeatedly and accurately positioned with respect to fixed reference points on a machine, which is of the type that have a fixed position for the processing tool with respect to a movable support table.

For example, in creep feed grinding, a rotating grinding wheel is mounted on a fixed spindle and the part to be processed is mounted on a movable support table, which is generally moved along one plane, generally a horizontal plane with respect to the fixed rotating grinding tool. Therefore, by the present invention, a part to be worked on can be accurately positioned with respect to a fixed horizontal reference plane and a fixed vertical reference plane for the grinding operation.

According to a first embodiment of the present invention, the locating device for positioning a workpiece includes a base that is adapted to be fixedly mounted on a support table that forms part of the workpiece-processing apparatus, with a fixture plate supported on the base that has the workpiece mounted in a fixed position thereon.

The fixture plate and the base have first and second cooperating positioning means for accurately aligning the fixture plate with respect to the base along a generally horizontal first axis, and in the assembled position tilting of the fixture plate with respect to the base is eliminated.

The fixture plate is also accurately positioned with respect to a second perpendicular horizontal axis on the base through an adjustable abutment that defines a fixed-point contact with respect to the fixture plate and hydraulic clamps are utilized for locking the fixture plate in the adjusted position on the base.

Preferably, the locking mechanism is in the form of a first locking cylinder that cooperates with one edge of the fixture plate and two transversely-spaced release cylinders cooperating with the opposite edge of the fixture plate with the adjustable abutment means located between the pair of hydraulic clamping members and aligned with the axis of the first locking member.

The first and second positioning means are designed and configured to accurately position the fixture plate along the longitudinal axis of the first locking cylinder and are centered between opposite lateral edges of the fixture plate and the supporting base. The first positioning means preferably consist of a fixed elongated member that defines opposed surface contact points with respect to the second positioning means and the first positioning means also includes elongated guide means in the form of tapered guide surfaces. More specifically, the first positioning means includes a first elongated member that defines a generally V-shaped elongated slot running the length of the base and has inclined outwardly-tapered surfaces that define guide surfaces, as will be explained.

The first positioning means also includes a second member that defines a hemispherical portion which is slightly greater than one-half the diameter of the member and has an exposed flat surface located above the two inclined guide surfaces.

The second positioning means preferably includes first and second spaced plates which are releasably secured to the fixture plate through a threaded member and have a spacer interposed therebetween to define two depending surfaces which are adapted to engage the two opposed surfaces of the first positioning means. One of the depending plates preferably has a camming surface to guide the plates over the arcuate elongated abutment member. The second positioning means also includes a pair of transversely-spaced elongated guide members that have inclined surfaces exposed to the inclined surfaces of the first positioning means and are located on opposite sides of the respective plates to guide the plates into accurate alignment with the opposed surfaces without any tilting.

Thus, the first and second positioning means accurately position the fixture plate with respect to the base, which is secured to a fixed position on the machine-support table, and thus define a fixed reference plane for the workpiece or part with respect to the machine or processing apparatus.

A second adjusting means defines a fixed reference point with respect to an axis that is perpendicular to the reference plane described above and consists of a circular abutment means that is generally aligned with the center of the base and the fixture plate and defines a point contact with one edge of the fixture plate in alignment with the axis of the first and second elongated positioning means, as well as the clamping means. The abutment means is in the form of a circular member mounted on an eccentric axis on the base to be rotatable and thereby axially move the contact point for the fixture plate with respect to the base.

Once accurately positioned, the fixture plate is automatically preferably hydraulically clamped to the base. For this purpose, the base has a first hydraulic clamping means aligned with the axis of the positioning means and cooperating with one edge of the fixture plate, while second and third hydraulic latching means are positioned on opposite sides of the longitudinal axis or plane for the positioning means and interlock with an opposite edge of the fixture plate.

A second embodiment of the locating device for positioning a workpiece with respect to a workpiece-processing apparatus having a support is also disclosed. This alternative embodiment includes a base structure comprising two opposed clamping units that are secured to the support. The fixture plate, which has the workpiece fixedly secured to it, is supported by and generally between the two clamping units.

Each of the clamping units has attached to it a first positioning means that extends in the general direction towards the other clamping unit. Specifically, this first positioning means includes an elongated abutment member that is semi-circular or arcuate in cross-section. Further, this abutment member has opposed surfaces with a cam portion at the uppermost portion of each of these opposed surfaces.

Connected to the fixture plate is a second positioning means that mates with the first positioning means secured to the clamp units. When mated, the two positioning means align the fixture plate along a generally horizontal axis above the support. This second positioning means includes a first and second member for engagement with the opposed surfaces of the arcuate portion abutment member. Like the first embodiment, the first and second members are spaced plates that depend from the fixture plate. Specifically, the plates are attached to and depend from a retainer member secured to the fixture plate.

To secure the fixture place in the proper position, each clamping unit houses a moveable locking member that extends out from and retracts into the clamping unit. This locking member has an inclined abutment at one end for engaging perimeter locking means that are secured to the fixture plate. When extended outwardly and engaging the perimeter locking means, the locking members are in a clamping state and securing the fixture plate. Conversely, when retracted, the locking member is in an unclamping state. The perimeter locking means attached to the fixture plate comprises an outwardly projecting locking element that has an inclined surface for cooperating with the inclined abutment of the locking member.

Longitudinal positioning means for cooperating with one of the outwardly projecting locking elements positioned and secured in one of the clamping units. In the illustrated embodiment, the longitudinal positioning means is a bumper member that has a contacting surface and that is securely fastened to the block.

Hydraulic liquid chambers are provided for moving the locking members between the clamping position and the unclamping position.

With the system constructed in accordance with the teachings of the present invention, the parts to be processed can readily be secure and locked in an accurate adjusted position with respect to the processing apparatus and repeatability within substantially less than one-thousandth of an inch is assured within any specific attention being required by the operator.

Stated another way, the fixture plate can be accurately precision formed and need only be generally aligned prior to being inserted onto the base or between the clamping units. Once positioned on the base or between the clamping units, the hydraulic clamping means will automatically ensure that the fixture plate, and thus the part, are accurately positioned with respect to a horizontal point on the machine. The vertical position for the part can be defined by proper height formation.

BRIEF DESCRIPTION OF DRAWINGS

FIG. 1 is a schematic illustration of a creep feed grinder having the present invention incorporated therein;

FIG. 2 is a plan view of a first embodiment of the locating mechanism of the present invention;

FIG. 3 is a longitudinal cross-sectional view as viewed along line 3—3 of FIG. 2;

FIG. 4 is an end view as viewed along line 4—4 of FIG. 2;

FIG. 5 is a cross-sectional view as viewed along line 5—5 of FIG. 3;

FIG. 5A is an enlarged fragmentary cross-sectional view of the positioning means;

FIG. 6 is a plan view of a second embodiment of the locating mechanism of the present invention;

FIG. 7 is a longitudinal cross-sectional view, as viewed along line 7—7 of FIG. 6;

FIG. 8 is a cross-sectional view, as viewed along line 8—8 of FIG. 6;

FIG. 9 is a sectional view of the longitudinal positioning means along line 9—9 of FIG. 6;

FIG. 10 is a perspective view of an elongated element; and,

FIG. 11 is a sectional view of an elongated element and a fixture plate.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to embodiment illustrated.

FIG. 1 of the drawings shows the general environment for the locating mechanism of the present invention. As shown therein, a workpiece-processing apparatus, generally designated by reference numeral 10, is illustratively shown as a creep feed grinder of the well-known type. The grinder or processing apparatus includes a main frame 12 that supports a movable support table or surface 14. The machine 10 includes a grinding wheel 16 which is secured to a spindle or shaft 18 that extends from frame 10 and is positioned above the table or platform 14.

According to the present invention, a locating device, generally designated by reference numeral 20, is fixedly secured to movable platform or table 14 and is designed to accurately position a workpiece or part (WP) with respect to the grinding wheel 16. The locating device is constructed and designed to be able to rapidly and effectively replace a finished workpiece with a new workpiece with a minimum attention of the operator and yet have the workpiece in an accurate controlled position with respect to the processing apparatus 10.

Thus, as illustrated in FIG. 2, a first embodiment of the locating device 20 includes a base 22 and a fixture plate 24 that is supported on the base 22. The base 22 includes a plurality of mounting pads 26 that are utilized to fixedly secure the base 22 to the machine tool table or platform 14. For this purpose, a plurality of screws (not shown) can be utilized for mounting the base 22 to the machine table 14 through the mounting pads 26. The base also has a reference surface 27 defined on a flange 28 secured to one edge thereof to form a reference point for checking the dimensions of the assembled components.

According to the primary aspect of the invention, a unique positioning means is interposed between the base 22 and the fixture plate 24 for accurately positioning the workpiece (WP) on the fixture plate with respect to the processing components, i.e., the grinding wheel, of the machine tool 10. As shown in FIG. 5, the positioning means or aligning mechanism incorporates a first positioning means 30 secured to the base 22 and a cooperating second positioning means 32 mounted on the fixture plate 24.

The first positioning means includes a first support member 34 and a second aligning member 36 which are interconnected through threaded screws 38 (FIG. 3). The first and second members 34 and 36 run substantially the entire length of the base 22 and are fixedly secured with respect to the longitudinal and transverse direction through a plurality of screws 40 and 42, that extend perpendicular to each other. Preferably, the first positioning means is mounted within a groove or slot 44 that runs the length of the base 22 and defines an abutment surface 46 for one edge of the first or guide member 34, as shown in FIG. 5. Thus, the screws 42 will provide an accurate position in cooperation with the abutment 46 for the transverse position of the first positioning means 30 with respect to the base 22 while the screws or fasteners 40 fixedly secure the first positioning means in the longitudinal direction with respect to the slot 44.

The first positioning means, and more particularly the first member 34, has a pair of inclined guide surfaces 50 defined between a generally V-shaped slot 52 which receives and supports the second member 36. As more clearly shown in FIG. 5, the second member is generally arcuate in cross-section and is in the form of a half-round defining a semi-circular segment that is slightly greater than one-half the diameter of the half-round 36 and has a generally exposed flat upper surface 54 for receiving the half-round 36. The arcuate member 36 defines an elongated abutment member which has opposed exposed surfaces 56 that provide contact points, as will be described later.

The second positioning means 32 is fixedly secured to the fixture plate and includes a pair of depending first and second plates 60, 60a having a spacer 62 therebetween. The first and second plates are accurately positioned with respect to an abutment surface 64 and are rigidly secured through a plurality of screws 66 that have positioning sleeves 68, as clearly shown in FIG. 5A. Thus, the first depending positioning plate 60 is forced into extended surface contact with the abutment 64, while the sleeve 68 produces a force on the other depending plate 60a so that the second depending plate depends in cantilever fashion below the spacer 62 and is free to deflect, as will be explained later.

In order to accurately guide the depending plates onto the guide member 36, the second plate 60a preferably has an inclined camming surface 69 formed thereon.

The second positioning means also incorporates first and second guide members 72, preferably formed from nylon material, that are respectively positioned on opposite sides of the depending plates 60 and define cooperating inclined surfaces 74 that cooperate with inclined surfaces 50 on member 34. The guide members 72 are secured in fixed position through fasteners 76, as is more clearly shown in FIG. 5A.

With the structure so far described, the first positioning means 30 including the elongated generally semicircular abutment member 36 and the first support member 34 are secured in a fixed aligned position through fasteners 40 and 42 with the surfaces 56 exposed above the exposed surface of the base 22, which is fixedly secured to the machine table or platform 14. The second positioning means 32 is secured to the fixture plate 24 and has the guide members 72 on opposite sides of the depending guide plates 60, 60a.

The fixture plate 74 is then generally aligned with the base 22 in the general position shown in FIG. 5 and the guide surfaces 74 on nylon guide members 72 cooperate with the inclined guide surfaces 50 to generally align and guide the depending plates 60 on opposite sides of the exposed surfaces 56 of the member 36. During the final guiding movement of the fixture plate onto the member 36, the fixed plate 60, located on the right in FIG. 5, defines a fixed abutment to define an accurately-aligned position of this depending plate with respect to member 36. At the same time, the camming surface 69 will guide the second depending plate 60a over the member 36 and the inherent resiliency of the steel plate 60a will cause a slight deflection of the second plate 60a to provide extremely accurately aligning of the entire fixture plate 24 with respect to the base 22.

It should be noted that the depending plates 60, 60a, as well as the member 36 and member 34, extend substantially the entire length of the fixture plate, as more clearly illustrated in plan view in FIG. 2, so that the fixture plate is moved from an approximate position defined by the guide member 72 and the guide surfaces 50 to an extremely accurate close-tolerance final position, illustrated in FIG. 5. The depending free cantilevered plate 60a, with its camming surface 69, will produce a generally horizontal force to positively grip the member 36 between plates 60, 60a to prevent any lateral movement of the fixture plate on the base and maintains a tolerance of within a few ten-thousandths of an inch.

After being assembled to the final position shown in FIG. 5, the fixture plate is clamped to the base by clamping means, which will be described in greater detail hereinafter. With the fixture plate 24 on the base 22, and guided into the accurate position, the fixture plate will be in a true position with respect to a generally horizontal axis of movement on the machine table 14, with no possibility of tilting with respect to such horizontal axis.

As indicated above, the locating device is also designed to define an extremely close-tolerance fixed position of the fixture plate on the base with respect to a second generally horizontal axis that is perpendicular to the first horizontal axis, and more particularly generally along the plane of the first and second positioning means. Thus, as shown in FIGS. 2 and 4, the base 22 has an adjustable abutment means 80 on the base which defines a 0 (zero) reference point for the fixture plate with respect to the base.

The details of the adjustable abutment means 80 or what may be referred to as a clocking diameter to set a 0 (zero) reference point is more clearly illustrated in FIG. 4 and includes a generally circular member 82 that has a base portion 82a received into a circular opening 84 in the base and has an eccentric intermediate circular portion 86 integral therewith. A spacer 87 received into the lower open end portion of the opening 84 receives a threaded fastener 88 which is threaded into the member 82 to securely fix the abutment member 80 in an accurate adjusted position on the base. It should be noted that the abutment member 80 defines a fixed contact point 89 on the periphery thereof and is always located on the center line of the elongated positioning means 30, 32, as most clearly shown in FIG. 2. Once the clocking diameter member 80 has been adjusted to set the 0 (zero) position, and the fixture plate has been accurately aligned in the longitudinal direction or along the horizontal axis of the positioning means, the fixture plate is securely locked into position through the use of a single clamping means 100, preferably in the form of a hydraulic clamp.

The hydraulic locking means 100 includes a block 102 that is fixed to the base 22 and has a fluid chamber 104 defined therein. A piston 106, having a piston rod 108, is reciprocated in the chamber 104. The locking means 100 is preferably of the one-way type that is normally biased or has its piston 106 biased to a retracted position by a biasing spring 110.

The locking means 100 cooperates with a locking element 112 that is secured to one edge of the fixture plate 24 through a plurality of screws 114. The locking element 112 by the piston rod 108 have cooperating inclined camming surfaces 116 so that the fixture plate is securely locked against the contact point 89 on the adjustable abutment means 80 and the piston rod 108 at the opposite edge.

The locking means also incorporates further positioning-defining release mechanisms or cylinders 120 (FIG. 2) secured to the base 22 and equally spaced on opposite sides of the abutment means 80. Each mechanism 120 includes a block 122 (FIG. 3) secured to the base 22 and having a chamber 124 defined therein. The chamber receives a piston rod 126 which is biased through a biasing mechanism, generally designated by reference numeral 128. The piston rod 126 again cooperates with a locking element 130 secured to an edge of the fixture plate 24 and the piston rod and locking element 130 have cooperating inclined locking surfaces 132.

Thus, the release cylinders 120 cooperate with one edge of the fixture plate 24 to define dual-spaced contact points or securing means for the fixture plate along one edge of the fixture plate, while the locking means 100 defines a centered securing means along a second edge of the fixture plate. The biasing mechanism 128 will bias the piston rods 126 to the extended position, shown in FIG. 3, while the bias of spring 110 will bias the piston rod 108 to the normal retracted position.

In assembling the fixture plate onto the base, it is only necessary to drop the fixture plate onto the base and accurately align the longitudinal axis thereof with the positioning means 30, 32, as viewed in FIG. 2, and then apply a pressurized hydraulic fluid to the chamber 104 which will lock the fixture plate in an accurately-fixed position against the abutment or stop 80, while the release cylinders 102 provide a clamping force on opposite sides of the abutment means 80.

After a part supported by the fixture plate 24 has been processed, the fixture plate and part can quickly be removed by introducing hydraulic fluid into chambers 124 of release cylinders 120 and relieving the pressure in chamber 104 of locking cylinder 100. A second part on an identical fixture plate is introduced and automatically positioned and locked with locking cylinder 100 for a repeat operation.

It has been found that a part can be accurately positioned within a few ten-thousandths of an inch and repeatability of positioning of successive parts is assured by the locating mechanism of the present invention. The same or a similar fixture plate can be used for different parts of a part family or a different part family by proper positioning of the part on the fixture plate. The horizontal reference point is defined by the positioning means 30, 32 and the abutment means 80, while the vertical reference point is defined by the size and height of the fixture plate and the position of the part of the fixture plate.

The locating device can readily be programmed using a CNC part program and the fixture plates can also be fabricated using computer programming. The fixture plate may be formed from a 4140 steel prehardened to 30–35 HRC. Likewise, the base may be formed from the same material or gray iron which provides a dampening effect. Preferably, the locating device elements are hardened to 60 HRC and are deep cryogenic treated to improve their resistance.

Thus, the locating device elements have extended life the perform a guiding function to meet the requirements of repeatability, exchangability and simplified handling, since the only moving parts are the clamping and release cylinders. Of course, other clamping means could be used.

It should be noted that the reference surface 27 is fully exposed along one edge of the base 22 and provides a surface that can be used to check the position of the part or workpiece on the device in the final assembled condition.

Various modifications in this embodiment come to mind without departing from the spirit of the present invention. For example, the fixture plate 24 could be something other than a plate so long as it includes the flat reference surface 64 and the clamping surfaces 116, 132 properly interrelated to position the part on the base with respect to reference surface 46.

Also, it is important that reference surface 46 be truly parallel to reference surface 27 and reference surface 64 so that the part is accurately positioned on machine table 14.

The processing apparatus 10 could also be a honing device, a milling device, a boring or drilling device or any other machine which requires movement of a part with respect to a fixed machining element.

Also, other securing means could replace the fasteners 40 and 42, such as dowel pins, which accurately position the positioning means 30 with respect to surface or abutment 46. Any other configuration for the base 22 and fixture plate or member 24 could be used.

An additional embodiment is shown in FIGS. 6–11. This second embodiment, generally designated by the reference numeral 220, includes a base structure comprising a first clamping unit 301a and an opposed second clamping unit 301b. For clarity, the fixture plate 224 is shown in phantom lines in FIGS. 6 and 7. A support plate 225 is fastened to and positioned directly above the fixture plate 224 for supporting the workpiece WP. The support plate 225 is shown by phantom lines in FIG. 7 and in profile in FIG. 8. While both a fixture plate 224 and a support plate 225 are shown in these FIGS, it should be understood that in may cases a support plate 225 is unnecessary. In such cases, the workpiece WP can be directly attached to the fixture plate 224.

Each clamping unit 301a, 301b includes a block 302 that is securely fastened to the machine tool table 14. A plurality of bolts or screws can be used for such a purpose. Apertures 303 in the block 302 are provided to receive such bolts or screws. The fasteners typically connect a channel member 14a that is disposed in a channel 14b in the work table 14. This arrangement permits each block to be movable and securely mounted on the table 14.

A plurality of fasteners 321 (FIG. 6) connect each block 302 to a support member 320. Dowel pins 322 are also disposed within and between each block 302 and support member 320 so as to maintain the support member in the same position with respect to the block. As shown in FIG. 6, the positioning means of this second embodiment or aligning mechanism incorporates a first positioning means 330 secured to each of the clamping units 301a, 301b. A cooperating second positioning means 232 (shown in phantom lines in FIG. 6) is mounted on the fixture plate 224.

Each first positioning means 330 includes an aligning or guide member 336 that is securely mounted to the support member 320 by fasteners 337. Shown particularly in FIGS. 6 and 7, the guide member 336 includes an elongated inwardly extending portion 336a and a flange portion 336b. Preferably, the flange portion 336b projects radially from the extending portion 336a and is arcuate in cross-section with a plurality of holes therein for receiving the fasteners 337.

Shown in FIG. 8, the inwardly extending portion 336a is generally arcuate in cross-section and includes a substantially flat, exposed upper surface 334, an arcuate portion 335, having opposed sides, and a pair of inclined camming surfaces 338, each disposed between the upper surface and the arcuate portion. Each inclined camming surface 338 abuts the arcuate portion 335 on one side and the flat upper surface 334 on the other side. As with the first embodiment of this invention, the arcuate portion 335 defines an elongated abutment member which has opposed exposed surfaces that provided contact points (line contact) for the second positioning means 232.

Also shown in detail in FIG. 8, each cooperating second positioning means 232 is fixedly secured to the fixture plate 224 and includes a pair of depending first and second plates 260,260a securely fastened to a retainer 261. The retainer 261 includes a cylindrical head portion 263 and an integral, cylindrical body portion 262. The cross-sectional area of the head 263 is less than the cross-sectional area of the body 262. A threaded channel 264 is disposed axially through the retainer 261 to permit a screw 264a to pass therethrough for securing the retainer 261 to the fixture plate 224. A portion of each of the opposed sides of the body 262 of the retainer 261 is cut-out so as to form opposed, vertical flat surfaces 268,267a for direct abutment with the first and the second depending plates 260,260a. A plurality of threaded channels are also provided in each of the depending plates 260,260a and in the retainer body 262 for permitting screws 266 to rigidly secure the plates to the retainer.

Accordingly, to position the fixture plate 224 properly in the horizontal plane, the plate 224 is lowered down in such a manner so that the opposed second positioning means 232 is in close contact with the grips the corresponding opposed first positioning means 330 therebetween. This is easily accomplished by positioning the depending plates 260,260a of each second positioning means 232 above the guide member 336a of each first positioning means 330. The fixture plate 224 is lowered so that the guide members 330 are disposed between and just below the depending plates 260,260a. Either pressing firmly down on the fixture plate 224 or by gravity acting on the fixture plate, the cam portions 338 of each guide member 330 guide a portion of the guide member 330 to slide between the depending plates 260,260a. Specially, the guide member 330 snaps into a close, frictionally engaging position, shown in FIG. 8, where the arcuate portion 335 of the guide member 330 has contact, specifically line contact, on opposed sides with each of the depending plates 260,260a and the flat upper surface 334 abuts the lower surface of the body 262 of the retainer 261. The depending plates 260,260a produce a generally horizontal force to positively grip the member 336 between plates 260,260a to prevent any lateral movement of the fixture plate on the base and maintain a tolerance of within ten-thousandths of an inch.

The above described acts position the fixture plate 224, the support plate 225 and, consequently, the attached workpiece WP, in the proper horizontal plane relative to the table 14 and the blocks 302. Perimeter locking means 430, longitudinal positioning means 460, and clamping means 530 are also included to lock the fixture plate 224 in this proper horizontal position and to lock and position the fixture plate 224 in the proper longitudinal position and proper vertical plane, being that plane (or axis) perpendicular to the horizontal plane.

The perimeter locking means 430 comprises an elongated locking element 431 secured to the fixture plate 224. Specifically, in the embodiment illustrated, there are a pair of elongated locking elements 431 that are positioned on opposite sides of the fixture plate 224. One elongated locking elements 431 is shown in FIG. 10. Each such element 431 preferably is the length of the fixture plate 224 and screwed to the plate by a plurality of aligned fasteners (not shown) placed through apertures 431a in the element and into cooperating apertures 531b in the fixture plate 224. Specifically shown in FIG. 11, the apertures 531b in the fixtures plate 224 are off-set from the apertures 531a in the locking element 531 so that a screw passing therein will securely lock the plate and element together and prevent any motion therebetween when a force is placed on the locking element during the clamping process. Moreover, this offset provides a forced vertical contact between the two members (vertical surface A of the fixture plate 224 and vertical surface B of the locking element 531). This offset is very minute, about 0.006 inch.

The elongated locking elements 431 have outwardly projecting portions 432 that include an inclined abutment 433 for engaging the clamping means 530.

The clamping means 530 includes a locking member 531 movably mounted to each of the clamping units 301a, 301b. Each of the locking members 531 includes an inclined surface 532 that engages and mates with a corresponding inclined abutment 433 of the elongated locking element 431. Preferably, as shown in the plan view, FIG. 6, the first clamping unit 301a includes two locking members 531 for moving and projecting inwardly to engage one of the locking elements 430 fixedly secured to the fixture plate 224, and the second clamping unit 301b includes one locking member 531 for moving and projecting inwardly to engage the other locking element 430 secured to the fixture plate 224.

Each of the five locking members 531 are connected to a hydraulic liquid cylinder. Turning to the first clamping unit 301a, the locking member 531 is slidably disposed within a channel 303 in the block 302. At one end of the channel 303, there is a cover 304 fixedly secured by a plurality of fasteners 305 to the block 302 so as to form a seal. A plurality of springs 306 disposed within the block channel 303 contact the cover 304 at one end and contact the internal surface of the locking member 531 at the other end so as to bias the locking member inwardly (to the right in FIG. 7). While coil type springs are shown in the figures, it is recognized that other type springs, such as disc springs, can be used.

A plurality or seals 307 are positioned between the block 302 and the locking member 531 for sealing the hydraulics therebetween. Disposed between the two seals 307 is a hydraulic chamber 308 for receiving the fluids. Consequently, when a fluid, such as oil, is fed into the chamber 308 by a feed (not shown), the chamber fills with the fluid and moves the locking member 531 outwardly (to the left in FIG. 7). When the fluid is removed from the chamber 308, the force of the springs 306 causes the locking member 531 to move inwardly (to the right in FIG. 7).

A pin 309 is provided that passes through the cover 304 and into the moveable locking member 531 in order to prevent rotation of the locking member 531 when it moves. Further, a wiper scraper 310 is secured to the block 302 to prevent any dirt or debris that might collect on the portion of the locking member 531 that extends into the surrounding atmosphere from being brought into the chambers and the inner parts. Additionally, a nylon protective cover 311 is secured to the block 302 above the locking members 531 to both protect the locking members and aid in the setting and removing of the fixture plate 224.

Similarly, turning to the second clamping unit 301b, the locking members 531 are also slidably disposed within channels 303 in the block 302. At one end of each channel 303, there is a cover 304 secured to the block 302 by a plurality of fasteners 305. Springs 306 are disposed within each block channel 303 that contact the cover 304 at one end and contact the internal surfaces of the locking members 531 at the other end so as to bias the locking member outwardly (to the right in FIG. 7). Seals 307 are positioned between the block 302 and each locking member 531, and chambers 308 are positioned between these seals 307. Thus, as before, when the fluid is fed into the chambers 308 by a feed (not shown), the chambers fill with the fluid and move the locking members 531 inwardly (to the left in FIG. 7). When the fluid is removed from the chambers 308 in the second clamping units 301b, the force of the springs 306 cause the locking members 531 to move outwardly (to the right in FIG. 7).

Pins 309 are provided that pass through each cover 304 and into each of the moveable locking members 531 in order to prevent rotation of the locking members 531 within the channels 303. Wiper scrapers 310 are secured to the block 302 and a nylon protective cover 311 is secured to the block 302 above the locking members 531.

To protect both the locking elements 431 secured to the fixture plate 224 and the support members 320 connected to the block 302, a plurality of pads 550 are secured to the support members 320 by fasteners 551.

A longitudinal positioning means 460 is provided to align the fixture plate 224 in the proper longitudinal position and in the vertical axis perpendicular to the horizontal plane. This longitudinal positioning means, shown in phantom in FIG. 6 and in sectional in FIG. 9, includes a bumper member 461 that is adjustable and is fixedly secured to the block 302 of the first clamping unit 301a by a fastener 462. The bumper 461 has a contacting surface 463 that acts as a fixed abutment to lock the fixture plate in an accurately-fixed position against the abutment or stop. When the bumper member 461 is fastened into place, the contacting surface 463 provides a reference wall, that will not change, to clamp the fixture plate against each time the plate is locked into position.

To lock a fixture plate 224 into position in this second locating device 220, one first applies a pressurized hydraulic fluid to the chamber 308 in the first clamping unit 301a. This causes the locking member 531 disposed within the first clamping unit 301a to retract and move away from the other clamping unit 301b (to the left in FIG. 7). The locking member 531 of the second clamping unit 301b is biased in the retracted position.

The fixture plate 224 is placed between the two opposed clamping units 301a, 301b. Specifically, as described previously, the fixture plate 224 is lowered so that the guide members 330 are snapped into a close, frictionally engaging position between the depending plates 260, 260a such that the arcuate portion 335 of the elongated generally semi-circular abutment member 336 has point contact on opposed sides with the depending plates 260, 260a and the flat upper surface 334 abuts the lower surface of the body 262 of the retainer 261.

The hydraulic fluid is then removed from the first clamping unit 301a which causes the locking element to move inwardly and towards the other clamping unit 301b (to the right in FIG. 7). Next or simultaneously, hydraulic fluid is injected into the chamber 308 in the second clamping unit 301b. This causes the locking member 531 disposed within the second clamping unit 301b to move inwardly and towards the other clamping unit 301b (to the left in FIG. 7).

Accordingly, the inclined surfaces 532 of each of the locking members 531 engage the inclined abutment 433 of each of the outwardly projecting portions 432 of each of the locking elements 431. The force of the locking members 531 of the second clamping unit 301b caused by the hydraulic liquid is very strong and pushes the entire fixture plate 223 towards the opposed clamping unit (to the left in FIG. 7) until the locking member 531 contacts the contact surface 463 of the bumper member 461. In comparsion with the force caused by the locking member 531 in the second clamping unit 301b, the resistance caused by the springs 306 biasing the locking member 531 in the first clamping unit 301a is minimal. The mating of the locking elements 431 and locking members 531 secure the fixture plate 224, support plate 225 and workpiece WP in this position. The workpiece is then worked on.

After a part supported by the fixture plate 224 has been processed, the fixture plate and part can quickly be removed by introducing hydraulic fluid into the chamber 308 of the second clamping unit 301b and relieving the pressure in the chamber 308 of the first clamping unit 301a. A second part on an identical fixture plate is then introduced and automatically positioned and locked for a repeat operation.

While specific embodiments have been described, numerous modifications come to mind without significantly departing from the spirit of the invention and the scope of protection is only limited by the scope of the accompanying claims.

I claim:

1. A locating device for positioning a workpiece with respect to a workpiece-processing apparatus having a support comprising:
   a base unit adapted to be fixed to the support;
   a fixture plate supported by said base unit for supporting the workpiece;
   first positioning means secured to said base unit;
   cooperating second positioning means having a first and second member secured to said fixture plate for aligning said fixture plate along a generally horizontal axis above said base unit,
   said second positioning means gripping said first positioning means therebetween; and,
   clamping means disposed within said base unit for securing said fixture plate to said base unit in an aligned position.

2. A locating device as defined in claim 1, in which said first positioning means includes an elongated abutment member having opposed surfaces, said first and second members engaging said opposed surfaces.

3. A locating device as defined in claim 2, in which said elongated abutment member is arcuate in cross-section to provide contact points between said first and second members and said opposed surfaces.

4. A locating device as defined in claim 3, further including adjustable abutment means secured to said base unit defining a stop for said fixture plate for aligning said fixture plate with respect to an axis perpendicular to said generally horizontal axis.

5. A locating device for positioning a workpiece with respect to a workpiece-processing apparatus having a support comprising;
   a base adapted to be fixed to said support;
   a fixture plate supported on the base for supporting said workpiece;
   first positioning means on said base;
   cooperating second positioning means having a first and second member on said fixture plate for aligning said fixture plate along a generally horizontal axis on said base, said second positioning means gripping said first positioning means therebetween; and,
   clamp means on said base for securing said fixture plate to said base in an aligned position.

6. A locating device as defined in claim 5, in which said first positioning means includes an elongated abutment member having opposed surfaces, said first and second members engaging said opposed surfaces.

7. A locating device as defined in claim 6, in which said first and second positioning means includes cooperating guide members for guiding said first and second members with respect to said opposed surfaces.

8. A locating device as defined in claim 7, in which said elongated abutment member is arcuate in cross-section to provide point contact between said first and second members and said opposed surfaces.

9. A locating device for positioning a workpiece with respect to a workpiece-processing apparatus having a support comprising:
   a base adapted to be fixed to said support;
   a fixture plate supported on the base for supporting said workpiece;
   first positioning means on said base;
   cooperating second positioning means on said fixture plate for aligning said fixture plate along a generally horizontal axis on said base; and,
   clamp means on said base for securing said fixture plate to said base in an aligned position,
   said first positioning means including an elongated abutment member being arcuate in cross-section having opposed surfaces and said second positioning means including first and second members for engagement with said opposed surfaces and
   said first and second positioning means further including cooperating guide members for guiding said first and second members with respect to said opposed surfaces,
   said first and second members are spaced plates depending from said fixture plate with one of said spaced plates having a camming surface to guide said plates with respect to said opposed surfaces.

10. A locating device as defined in claim 9, further including adjustable abutment means on said base defining a stop for said fixture plate with respect to said base to accurately position said fixture plate on said base with respect to an axis perpendicular to said generally horizontal axis.

11. A locating device as defined in claim 10, in which said adjustable abutment means includes an eccentric member rotatable on said base and engageable with an edge of said fixture plate.

12. A locating device as defined in claim 5, further including adjustable abutment means on said base defining a stop for said fixture plate with respect to said base to accurately position said fixture plate on said base with respect to an axis perpendicular to said generally horizontal axis.

13. A locating device as defined in claim 12, in which said adjustable abutment means includes an eccentric member rotatable on said base and engageable with an edge of said fixture plate.

14. A locating device for positioning a workpiece with respect to a workpiece-processing apparatus having a support comprising;
   a first clamping unit and a second clamping unit adapted to be fixed to the support;
   a fixture plate supported between said clamping units for supporting the workpiece;
   an inwardly extending first positioning means fixedly secured to each of said clamping units;
   cooperating second positioning means having a first and second member fixedly secured to said fixture plate for aligning said fixture plate along a generally horizontal axis above the support, said second positioning means gripping said first positioning means therebetween; and, clamp means disposed within each of said clamping units for securing said fixture plate between said clamping units in an aligned position.

15. A locating device as defined in claim 14, in which said first positioning means includes an elongated abutment member having opposed surfaces, said first and second members engaging said opposed surfaces.

16. A locating device as defined in claim 15, in which said elongated abutment member is arcuate in cross-section to provide contact points between said first and second members and said opposed surfaces.

17. A locating device as defined in claim 16, in which each of said clamp means includes a moveable locking member having an inclined abutment for cooperating with a locking element having a cooperating inclined surface fixedly secured to said fixture plate, each said locking member being moveable between a clamping position and an unclamping position.

18. A locating device for positioning a workpiece with respect to a workpiece-processing apparatus having a support comprising:

a first clamping unit and a second clamping unit adapted to be fixed to the support;

a fixture plate supported between said clamping units for supporting the workpiece;

inwardly extending first positioning means fixedly secured to each of said clamping units;

cooperating second positioning means on said fixture plate for aligning said fixture plate along a generally horizontal axis above the support; and, means for securing and accurately aligning said fixture plate between said clamping units with respect to an axis perpendicular to said generally horizontal axis, said first positioning means including an elongated abutment member being arcuate in cross-section and having opposed surfaces with a cam portion at the uppermost portion of said opposed surface, and said second positioning means including first and second members for engagement with said opposed surface, said first and second members being spaced plates depending from said fixture plate.

19. A locating device as defined in claim 18, in which said means for securing and accurately aligning said fixture plate includes a moveable locking member having an inclined abutment for engaging perimeter locking means secured to said fixture plate, each said locking member being moveable between a clamping position and an unclamping position.

20. A locating device as defined in claim 19, in which said perimeter locking means includes a locking element having an inclined surface fixedly secured to said fixture plate for cooperating with said inclined abutment.

21. A locating device as defined in claim 20, further including longitudinal positioning means for cooperating with one of said locking elements attached to said fixture plate.

22. A locating device as defined in claim 18, in which said longitudinal positioning means is a bumper member having a contacting surface securely fastened to said block.

23. A locating device as defined in claim 18, in which each of said locking members is moved between said clamping position and said unclamping position by hydraulic liquid introduced into or removed from a chamber disposed within said clamping unit.

24. A locating device for positioning a workpiece with respect to a workpiece-processing apparatus having a support comprising:

two opposed clamping units secured to the support;

a fixture plate supported by said clamping units for supporting the workpiece;

inwardly extending first positioning means fixedly secured to each of said clamping units, said first positioning means including an elongated abutment member being arcuate in cross-section and having opposed surfaces with a cam portion at the uppermost portion of said opposed surfaces;

cooperating second positioning means on said fixture plate for aligning said fixture plate along a generally horizontal axis above the support, said second positioning means including first and second plates depending from said fixture plate for engagement with said opposed surface;

a moveable locking member disposed in each said clamping unit for securing and accurately aligning said fixture plate between said clamping units with respect to an axis perpendicular to said generally horizontal axis, said locking member having an inclined abutment for engaging an inclined surface fixedly secured to said fixture plate, each said locking member being moveable between a clamping position and an unclamping position; and, longitudinal positioning means for cooperating with one of said locking elements.

25. A locating device as defined in claim 24, in which said longitudinal positioning means is a bumper member having a contacting surface securely fastened to said block.

26. A locating device as defined in claim 25, in which each of said clamping means is moved between said clamping position and said unclamping position by hydraulic liquid introduced into or removed from a chamber disposed within said clamping unit.

27. A locating device for positioning a workpiece with respect to a workpiece-processing apparatus having a support comprising:

two opposed clamping units secured to the support for supporting a fixture plate holding the workpiece;

each of said clamping units including inwardly extending first positioning means fixedly secured to each of said clamping units;

cooperating second positioning means on said fixture plate for aligning said fixture plate along a generally horizontal axis;

each of said clamping units further including a moveable locking member for securing and accurately aligning said fixture plate between said clamping units with respect to an axis perpendicular to said generally horizontal axis; and, longitudinal positioning means disposed within one of said clamping units for cooperating with said fixture plate.

28. A locating device as defined in claim 27, in which each of said locking members is moved between said clamping position and said unclamping position by hydraulic liquid introduced into or removed from a chamber disposed within said clamping unit.

* * * * *